United States Patent

Copeland

(10) Patent No.: US 9,168,847 B2
(45) Date of Patent: Oct. 27, 2015

(54) HORIZONTAL ACTION SEAT TILT MECHANISM AND BEZEL

(71) Applicant: Sears Manufacturing Co., Davenport, IA (US)

(72) Inventor: Mark A. Copeland, Silvis, IL (US)

(73) Assignee: Sears Manufacturing Co., Davenport, IA (US)

(*) Notice: Subject to any disclaimer, the term of this patent is extended or adjusted under 35 U.S.C. 154(b) by 2 days.

(21) Appl. No.: 14/156,736

(22) Filed: Jan. 16, 2014

(65) Prior Publication Data

US 2015/0197166 A1    Jul. 16, 2015

(51) Int. Cl.
| | |
|---|---|
| *A47C 1/00* | (2006.01) |
| *A47C 3/00* | (2006.01) |
| *A47C 7/02* | (2006.01) |
| *B60N 2/10* | (2006.01) |
| *B60N 2/02* | (2006.01) |

(52) U.S. Cl.
CPC ........................................ *B60N 2/02* (2013.01)

(58) Field of Classification Search
CPC ........................................................ B60N 2/02
USPC ................. 297/313, 284.11, 463.1, 337, 340, 297/344.1
See application file for complete search history.

(56) References Cited

U.S. PATENT DOCUMENTS

| | | | | |
|---|---|---|---|---|
| 3,600,037 A | * | 8/1971 | Lohr ......................... | 297/284.11 |
| 4,155,593 A | * | 5/1979 | Swenson et al. ......... | 297/284.11 |
| 4,448,454 A | * | 5/1984 | Scott ............................. | 297/313 |
| 4,491,365 A | * | 1/1985 | Murakami ............... | 297/284.11 |
| 4,653,807 A | * | 3/1987 | Hirose et al. .............. | 297/367 R |
| 4,709,961 A | * | 12/1987 | Hill ........................... | 297/284.11 |
| 5,340,185 A | * | 8/1994 | Vollmer ............... | 297/284.11 X |
| 5,419,614 A | * | 5/1995 | Richards et al. ......... | 297/284.11 |
| 5,531,503 A | * | 7/1996 | Hughes ................. | 297/463.1 X |
| 5,601,338 A | * | 2/1997 | Wahls ........................... | 297/313 |
| 5,908,220 A | * | 6/1999 | Bauer et al. .............. | 297/313 X |
| 6,513,879 B1 | * | 2/2003 | Stern .......................... | 297/463.1 |
| 7,938,490 B2 | * | 5/2011 | Ishijima et al. .............. | 297/358 |
| 7,976,104 B2 | * | 7/2011 | Iwasaki et al. ............ | 297/463.1 |
| 8,454,091 B2 | * | 6/2013 | Therrien et al. .............. | 297/313 |
| 2002/0014798 A1 | * | 2/2002 | Elam .......................... | 297/463.1 |
| 2009/0026791 A1 | * | 1/2009 | Ishijima et al. ............ | 296/65.18 |
| 2009/0224585 A1 | * | 9/2009 | Bokelmann et al. .......... | 297/313 |
| 2010/0109406 A1 | * | 5/2010 | Ueda ............................. | 297/358 |
| 2010/0314927 A1 | * | 12/2010 | McCulloch et al. .......... | 297/313 |
| 2011/0241405 A1 | * | 10/2011 | Slagh ......................... | 297/463.1 |
| 2013/0169015 A1 | * | 7/2013 | Perraut et al. ................. | 297/313 |

* cited by examiner

*Primary Examiner* — Rodney B White

(74) *Attorney, Agent, or Firm* — Lane & Waterman LLP

(57) ABSTRACT

A seat tilt mechanism comprising a cam connected to a lever wherein the lever moves horizontally from a first position to a second position to actuate the cam; a latch configured to engage with the at least one detent and disengage with the cam when the lever is in the first position and configured to engage with the cam and disengage with the at least one detent when the lever is in the second position; said detent includes at least two positions which can be selectively engaged by the latch; and a seat rod configured for attachment between a seat frame and the at least one detent such that when the latch is engaged with the selected position, the tilt of the seat is defined.

13 Claims, 5 Drawing Sheets

US 9,168,847 B2

HORIZONTAL ACTION SEAT TILT MECHANISM AND BEZEL

BACKGROUND

The present disclosure relates to a mechanism used to tilt a seat and more particularly to a horizontal acting mechanism used to tilt a seat in a vehicle.

Many vehicle seats are equipped with a seat tilt adjustment that allows a passenger to adjust the incline of the seat. Often these adjustment mechanisms are located under the front of the seat or on the side of the lower seat cushion. One common type of seat tilt mechanism requires the passenger to reach between their legs and squeeze the vertical acting adjustment handle located on the seat bottom in order to actuate the seat tilt mechanism. This can be difficult because the seat tilt mechanism handle is often located just underneath the seat cushion and the weight of the passenger can cause the seat cushion to encroach on the handle making it difficult to squeeze the handle and actuate the mechanism. Moreover, the weight of the passenger can make it difficult to adjust the seat tilt to the desired position as the passenger's weight must be accounted for when adjusting the tilt. There is a need, therefore, for seat tilt mechanisms that can be easily accessed and actuated by passengers while they are seated.

SUMMARY

In one aspect, a seat tilt mechanism comprises a cam connected to a horizontally acting lever that moves from a first position to a second position to actuate a cam. The seat tilt mechanism also includes a latch configured to engage with a detent when the lever is in the first position and to disengage with the detent when the lever is in the second position. The detent includes at least two positions that can be selectively engaged by the latch. The seat tilt mechanism also includes a seat rod configured to attach between a seat and the detent such that the tilt of the seat is defined by the selected position of the detent.

In another embodiment, a bezel is configured to engage with a seat and receive a lever therethrough wherein the bezel prevents encroachment of the seat into the lever.

The above-described features and advantages, as well as others, will become more readily apparent to those of ordinary skill in the art by reference to the following detailed description and accompanying drawings. While it would be desirable to provide a seat tilt mechanism that includes one or more of these advantageous features, the teachings disclosed herein extend to those embodiments which fall within the scope of the appended claims, regardless of whether they accomplish one or more of the above-mentioned advantages.

DETAILED DESCRIPTION

Figure 1:
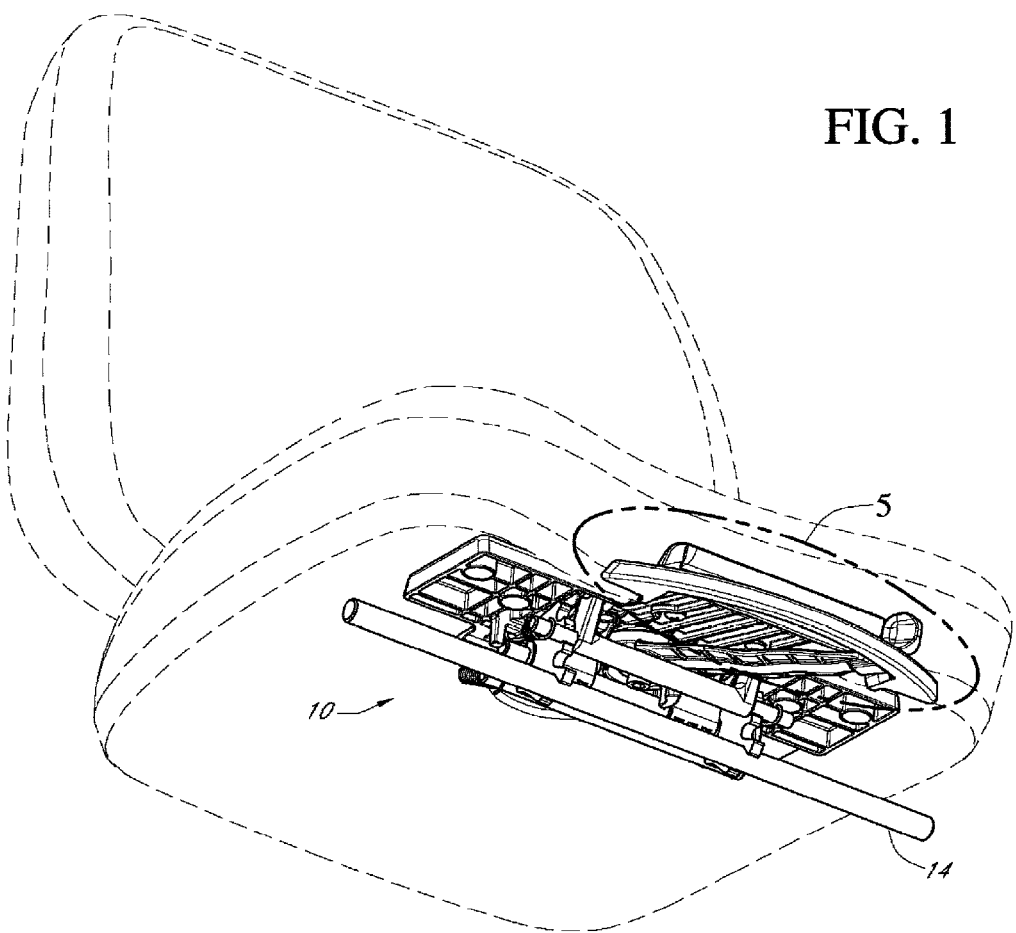
FIG. 1 is a perspective view of the seat tilt mechanism in accordance with the disclosure.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
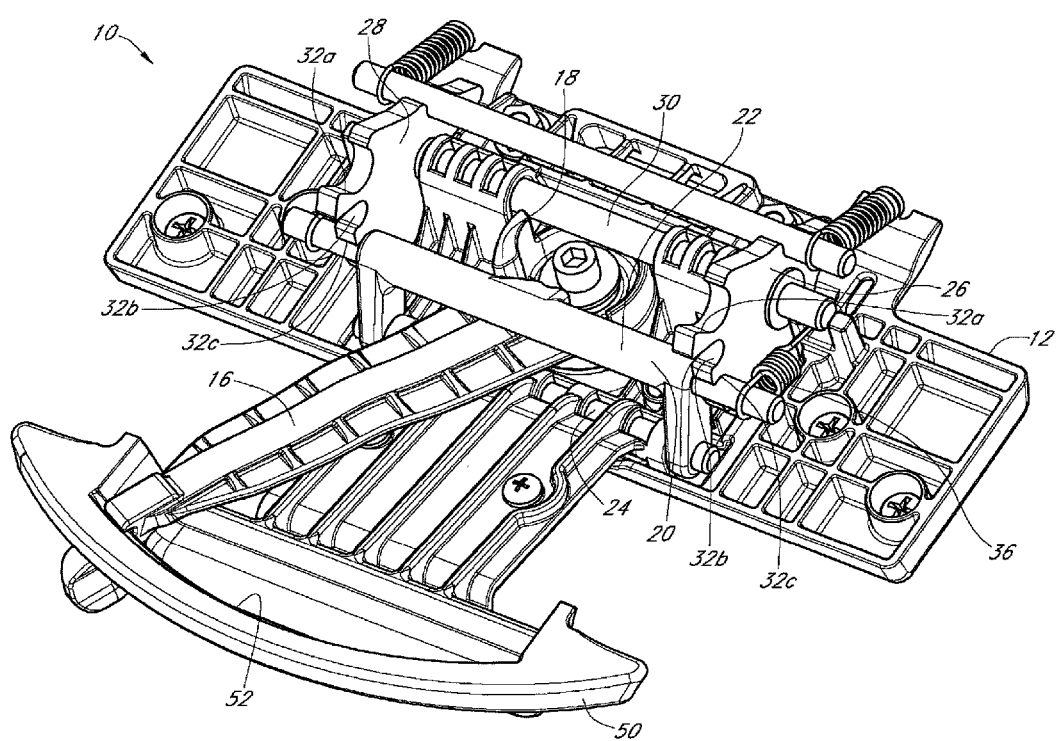
FIG. 2 is a perspective view of the underside seat tilt mechanism shown in FIG. 1.
Figure 3:
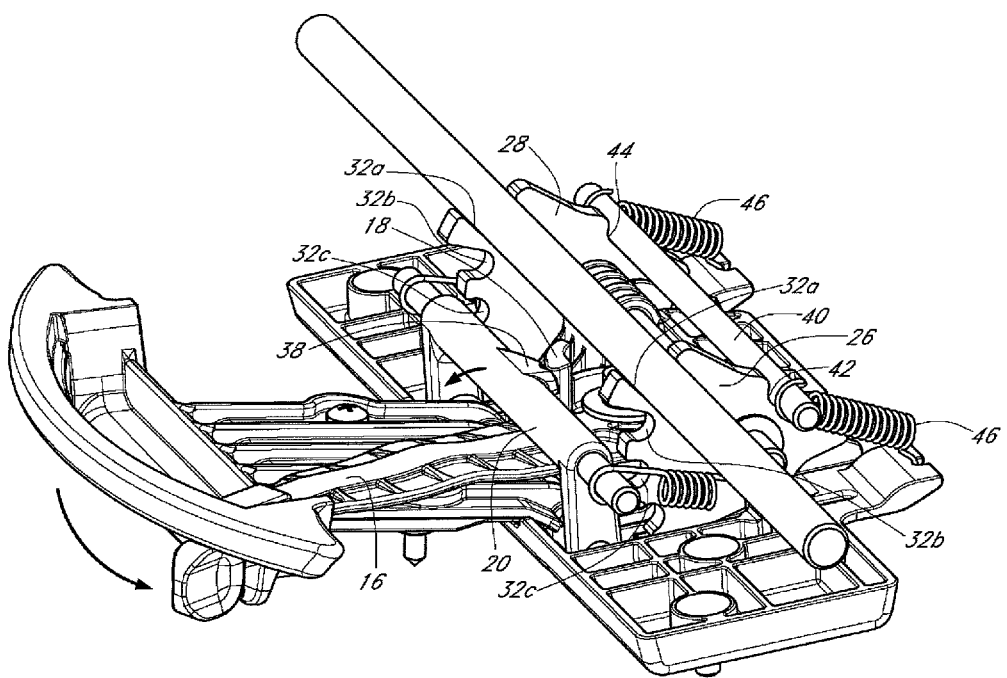
FIG. 3 is a perspective view of the seat tilt mechanism shown in FIG. 2 with the lever in a second position.
Figure 4:
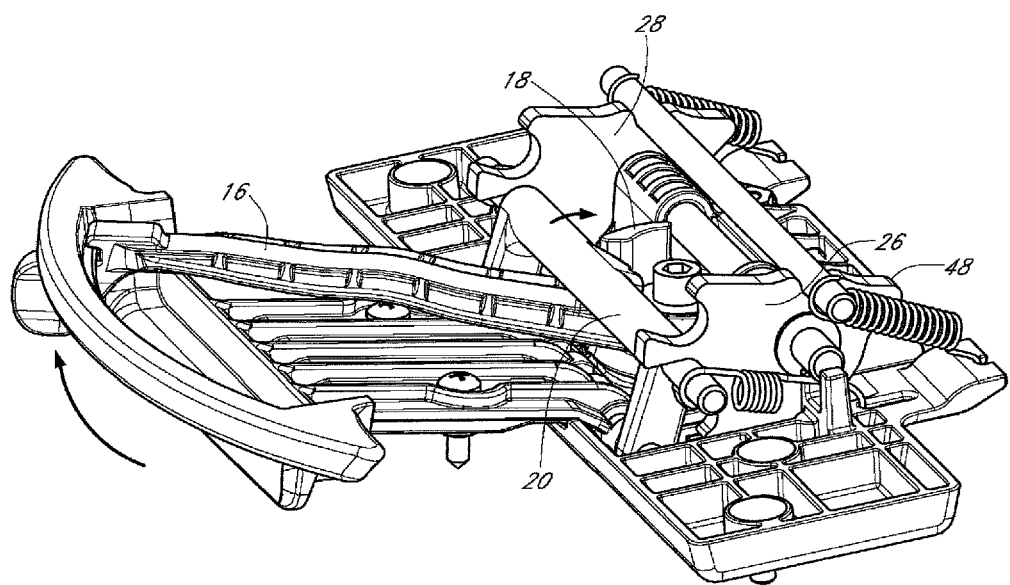
FIG. 4 is a perspective view of the seat tilt mechanism shown in FIG. 2 and FIG. 3 showing the lever in a first position.

One type of seat tilt mechanism 10 is shown in FIGS. 1 and 2. The mechanism includes a base 12 and a seat rod 14. The seat rod 14 is adapted for attachment to a seat frame (not shown) which is commonly known in the industry. The seat rod can be attached by any suitable type of attachment or coupling so long as the seat rod 14 is coupled such that the seat can tilt with respect to the seat frame in accordance with this disclosure. The seat rod 14 is mounted towards the front of a seat as best shown in FIG. 1 to aid in the tilting of the seat but other placement or positioning is contemplated by this disclosure. The base 12 is adapted for attachment to the underside of a seat which typically is a metal or plastic seat pan (not shown). The base 12 can be attached with fasteners or any other suitable means of attachment. The mechanism further includes a lever arm 16 attached to a cam 18. In one embodiment, lever arm 16 actuates horizontally and is in a locked position when the lever arm 16 is moved to one position. In the illustrations, the lever arm 16 is locked as shown in FIG. 4, and is unlocked when moved to another position as shown in FIG. 3.

The mechanism also includes a latch 20 which includes an engagement bar 22 and a hinge 24. The seat tilt mechanism 10 also includes two detents 26, 28 which are spaced apart and connected by a detent arm 30. Each detent is configured to include a number of slots 32 for receiving the engagement bar 22. The detent arm 30 is attached to each detent 26, 28 to ensure that the slots 32 on each detent 26, 28 are aligned in pairs. The engagement bar 22 is then received by the paired slots 32a, 32b, 32c when the mechanism is locked. Other configurations of engagement between the latch 20 and the detents 26, 28 are contemplated by this disclosure.

In one embodiment, the mechanism includes three pairs of slots that correspond to three tilt positions. Each pair of slots 32a, 32b, 32c is configured to receive the engagement bar 22 as discussed above. It will be appreciated that when the engagement bar 22 is received in pair 32a, that the seat rod 14 is displaced from the base 12 slightly and therefore the attached seat will be tilted slightly. As the lever arm 16 is actuated and the engagement bar 22 is received in slots 32b or 32c, the seat rod 14 will be displaced a greater distance from the base 12 and therefore the attached seat will be tilted more. It will be appreciated that additional pairs of slots can increase the number of tilt positions and that three pairs of slots are shown here for illustrative purposes only.

Referring to FIG. 2, in one aspect of the disclosure the latch 20 is biased towards engagement with the slots 32 using biasing springs 36. The biasing springs 36 can be connected to the base 12 at one end and to the ends of the engagement bar 22 at the opposite end such that the biasing springs 36 are preloaded or extended when the engagement bar 22 is engaged with the slots 32. It will be appreciated that by preloading the biasing springs 36 while the latch 20 engaged with the slots 32, the latch 20 is then biased towards engagement with the slots 32. Other configurations are also contemplated for biasing the latch towards the slots 32.

Referring now to FIGS. 2, 3 and 4, to actuate the mechanism, the lever arm 16 is moved to the unlocked position (FIG. 3). As the lever arm 16 moves to the unlocked position, the cam 18 is rotated about its axis and contacts the engagement bar 22 of the latch 20. The engagement bar 22 may include a contact surface 38 configured to ensure contact with cam 18. As the cam 18 rotates, it pushes the engagement bar 22 away from engagement with the slots 32 by rotating the latch 20 about its hinge 24 (shown in FIG. 2) which extends the biasing springs 36. While the engagement bar 22 is disengaged from the slots 32, the passenger is free to adjust the seat tilt to a desired position. In one embodiment, this adjustment can be further enabled by the use of a lifting rod 40. The lifting rod 40 is configured to attach to the detents 26, 28 on the backside as shown in FIG. 3. The lifting rod 40 can be welded to the detents 26, 28 in grooves 42, 44 or can be attached to the detents 26, 28 in any other suitable manner. The ends of the lifting rod 40 are secured to the base 12 with lifting springs 46. The lifting springs 46 are attached to the base 12 in such a manner as to load the springs so that they create a tension on the lifting rod 40. It can be appreciated that when the latch 20 is disengaged from the slots 32 the detents 26, 28 will be biased to rotate around the axis of the detent arm 30 because of the force created by the lifting rod 40 as applied to the backside of the detents 26, 28. It will be appreciated that a brake 48 (FIG. 4) can be included on the backside of one or more of the detents 26, 28 to prohibit rotation of the detents 26, 28 beyond a range of desirable seat tilt positions. It will further be appreciated that the lifting rod 40 and lifting springs 46 are not necessary for the positioning of the seat tilt mechanism but provide a means of biasing the mechanism which can make it easier to position when there is weight on the seat.

As shown in FIG. 4 after the desired tilt position has been selected, the lever arm 16 can be moved to the locked position, which will cause the cam 18 to rotate away from the engagement bar 22. With the cam 18 no longer pushing on the engagement bar 22, the tension from the biasing springs 36 will keep the engagement bar 22 positioned within the desired pair of slots 32.

Figure 5:
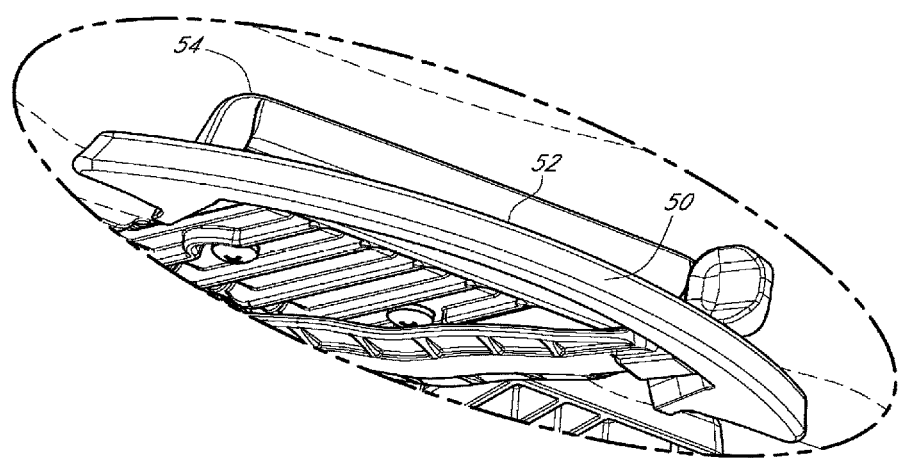
FIG. 5 is a perspective view of the bezel portion of the seat tilt mechanism shown in FIG. 1.

Referring to FIG. 5, in one embodiment, a bezel 50 is connected to the base 12 such that lever arm 16 extends through an opening 52 in the bezel 50. The bezel 50 further includes a flange 54 that is configured to engage a seat or seat cushion. It can be appreciated that the flange 54 prevents the seat or seat cushion from encroaching on the lever arm 16 during actuation.

Although the present disclosure relates to a seat tilt mechanism, the features disclosed herein may be incorporated into other types of seat positioning devices.

The foregoing detailed description of one or more embodiments of the seat tilt mechanism with a horizontal actuation has been presented herein by way of example and not limitation. It will be recognized that there are advantages to certain individual features and functions described herein. Moreover, it will be recognized that various alternatives, modifications, variations or improvements of the above-disclosed embodiments and other features and functions, or alternatives thereof, may be desirably combined into many other different embodiments, systems or applications. Presently unforeseen or unanticipated alternatives, modifications, variations or improvements therein may be subsequently made by those skilled in the art which are also intended to be encompassed by the appended claims.

What is claimed is:

1. A seat tilt mechanism comprising:
   a cam connected to a lever wherein the lever moves horizontally from a first position to a second position to actuate the cam;
   a latch configured to engage with at least one detent and disengage with the cam when the lever is in the first position and configured to engage with the cam and disengage with the at least one detent when the lever is in the second position;
   said detent includes at least two positions which can be selectively engaged by the latch; and
   a seat rod configured for attachment between a seat and the at least one detent such that when the latch is engaged with the selected position, the tilt of the seat is defined.

2. The seat tilt mechanism of claim 1, wherein the latch is biased towards engagement with the at least one detent by at least one spring.

3. The seat tilt mechanism of claim 1, wherein the mechanism includes two detents configured to engage with said latch.

4. The seat tilt mechanism of claim 3, wherein the two detents are connected by a detent rod.

5. The seat tilt mechanism of claim 4, wherein the detents include at least two pair of slots for receiving the latch.

6. The seat tilt mechanism of claim 5, wherein the detents include three pairs of slots for receiving the latch.

7. The seat tilt mechanism of claim 1, further comprising:
   a lifting rod connected to the at least one detent on the side opposite of the latch;
   at least one lifting spring attached to the lifting rod such that the at least one lifting spring causes the lifting rod to bias the detent towards rotation.

8. The seat tilt mechanism of claim 7 further comprising a bezel which is configured to engage with a seat and to receive the lever therethrough wherein the bezel prevents encroachment of the seat into the lever when the lever is moved from the first position to the second position and from the second position to the first position.

9. A seat tilt mechanism comprising:
   a base configured to attach to the underside of a vehicle seat;
   a seat rod configured to attach to a vehicle;
   a bezel configured to engage the seat and which receives a lever therethrough;
   a cam connected to the lever wherein the lever moves horizontally from a first position to a second position to actuate the cam;
   a latch configured to engage a pair of detents when the lever is in the first position and configured to disengage with the pair of detents in the second position;
   said pair of detents include at least two positions which can be selectively engaged by the latch wherein the seat rod is displaced from the seat by the pair of detents when the latch is selectively engaged with the detents.

10. The seat tilt mechanism of claim 9, wherein the latch is biased towards engagement with the pair of detents by at least one spring.

11. The seat tilt mechanism of claim 10, wherein the pair of detents include at least two pair of slots for receiving the latch.

12. The seat tilt mechanism of claim 11, wherein the detents include three pairs of slots for receiving the latch.

13. The seat tilt mechanism of claim 9, further comprising:
   a lifting rod engaged with the pair of detents on the side opposite of the latch; and
   at least one lifting spring attached to the lifting rod such that the at least one lifting spring causes the lifting rod to bias the detents towards rotation.

* * * * *